US010386492B2

(12) United States Patent
Large et al.

(10) Patent No.: US 10,386,492 B2
(45) Date of Patent: Aug. 20, 2019

(54) VERIFIABLE AUTHENTICATION SERVICES BASED ON GLOBAL NAVIGATION SATELLITE SYSTEM (GNSS) SIGNALS AND PERSONAL OR COMPUTER DATA

(71) Applicant: Trimble Inc., Sunnyvale, CA (US)

(72) Inventors: Peter Oliver Large, Westminster, CO (US); Jose Miguel Amor Molares, Arvada, CO (US); Patricia Clare Boothe, Broomfield, CO (US)

(73) Assignee: Trimble Inc., Sunnyvale, CA (US)

( * ) Notice: Subject to any disclaimer, the term of this patent is extended or adjusted under 35 U.S.C. 154(b) by 831 days.

(21) Appl. No.: 13/787,826

(22) Filed: Mar. 7, 2013

(65) Prior Publication Data
US 2014/0253376 A1    Sep. 11, 2014

(51) Int. Cl.
| G01S 19/21 | (2010.01) |
| G01S 19/42 | (2010.01) |
| G01S 19/39 | (2010.01) |
| G01S 19/14 | (2010.01) |

(52) U.S. Cl.
CPC .............. *G01S 19/21* (2013.01); *G01S 19/14* (2013.01); *G01S 19/39* (2013.01); *G01S 19/42* (2013.01)

(58) Field of Classification Search
CPC ....................................................... G01S 19/39
USPC ..................................................... 342/357.59
See application file for complete search history.

(56) References Cited

U.S. PATENT DOCUMENTS

| 5,075,693 | A | * | 12/1991 | McMillan ............... G01C 21/26 342/457 |
| 5,757,916 | A | * | 5/1998 | MacDoran et al. .......... 380/258 |
| 7,248,212 | B2 | | 7/2007 | Kato |
| 7,633,437 | B2 | | 12/2009 | Hatch |
| 7,830,950 | B2 | | 11/2010 | Valio et al. |
| 7,830,993 | B2 | | 11/2010 | Riley et al. |
| 7,860,145 | B2 | | 12/2010 | Knight et al. |
| 8,035,555 | B2 | | 10/2011 | Winkel |
| 8,144,054 | B2 | | 3/2012 | Geswender et al. |
| 8,243,772 | B2 | | 8/2012 | Knight et al. |
| 9,265,450 | B1 | * | 2/2016 | Giobbi ............... G06K 19/0718 |
| 2005/0162307 | A1 | | 7/2005 | Kato |
| 2007/0116098 | A1 | | 5/2007 | Valio et al. |
| 2007/0258511 | A1 | | 11/2007 | Knight et al. |
| 2008/0004798 | A1 | * | 1/2008 | Troxler ................ A01K 15/023 702/187 |
| 2008/0122688 | A1 | | 5/2008 | Hatch |
| 2008/0246655 | A1 | | 10/2008 | Winkel |

(Continued)

OTHER PUBLICATIONS

Navstar GPS User Equipment Introduction Sep. 1996. pp. 215. http://www.navcen.uscg.gov/pubs/gps/gpsuser/gpsuser.pdf.*

*Primary Examiner* — Vladimir Magloire
*Assistant Examiner* — Helena H Seraydaryan
(74) *Attorney, Agent, or Firm* — Kilpatrick Townsend & Stockton LLP

(57) ABSTRACT

A verified authentication device has a navigation receiver, a processor, and a verification device. Navigation signals are transmitted from a Global Navigation Satellite System (GNSS). The processor authenticates the navigation signals and determines position coordinates of the navigation receiver. The verified authentication device receives input from a user of the verified authentication device. The verified authentication device provides reliability of the position coordinates based on the input from the user.

23 Claims, 2 Drawing Sheets

(56) References Cited

U.S. PATENT DOCUMENTS

| | | | |
|---|---|---|---|
| 2008/0266116 A1* | 10/2008 | Hyatt | G08B 21/0269 |
| | | | 340/573.4 |
| 2009/0041089 A1 | 2/2009 | Jhang et al. | |
| 2009/0117879 A1* | 5/2009 | Pawar et al. | 455/412.1 |
| 2009/0207075 A1 | 8/2009 | Riley et al. | |
| 2010/0048155 A1 | 2/2010 | Wang | |
| 2010/0049615 A1* | 2/2010 | Rose | G06Q 20/02 |
| | | | 705/17 |
| 2011/0012808 A1 | 1/2011 | Tatarnikov | |
| 2011/0068958 A1 | 3/2011 | Knight et al. | |
| 2011/0181466 A1* | 7/2011 | Serrano et al. | 342/357.68 |
| 2011/0202466 A1* | 8/2011 | Carter | G06Q 20/20 |
| | | | 705/67 |
| 2011/0254731 A1* | 10/2011 | Musmeci | 342/357.25 |
| 2012/0026038 A1 | 2/2012 | Vollath | |
| 2012/0038512 A1 | 2/2012 | Geswender et al. | |
| 2013/0066744 A1* | 3/2013 | Higgins | G06Q 30/06 |
| | | | 705/26.41 |
| 2013/0145420 A1* | 6/2013 | Ting | H04L 63/08 |
| | | | 726/1 |
| 2013/0245946 A1* | 9/2013 | Carlson | G06F 1/1656 |
| | | | 702/5 |

\* cited by examiner

VERIFIABLE AUTHENTICATION SERVICES BASED ON GLOBAL NAVIGATION SATELLITE SYSTEM (GNSS) SIGNALS AND PERSONAL OR COMPUTER DATA

TECHNICAL FIELD

The technology relates to authentication services, and more specifically to authentication services utilizing the Galileo E6 authenticating signals.

BACKGROUND

The Galileo commercial service is one part of the new services available from the Galileo portion of the European Global Navigation Satellite Systems (GNSS). In particular, features and services available from the Galileo system enable the development of GNSS based authentication applications encompassing the users' identity, positioning, velocity and timing.

In particular, vulnerabilities in the system could enable undesirable manipulation of data, possibly leading to misleading results. Therefore there is a need for an added level of verification of obtained positioning information before it could be used for authentication purposes.

SUMMARY

This Summary is provided to introduce a selection of concepts that are further described below in the Detailed Description. This Summary is not intended to identify key or essential features of the claimed subject matter, nor is it intended to be used as an aid in determining the scope of the claimed subject matter.

A method for providing verified authentication services is presented. The method utilizes a verified authentication apparatus comprising a radio navigation receiver, a navigation processor, and a verification device. The method comprises: (A) receiving an authenticated navigation signal transmitted from a radio positioning system by using the radio navigation receiver, (B) obtaining the position coordinates, velocity and timing coordinates of the radio-navigation receiver by using the navigation processor, and (C) verifying reliability of the obtained position coordinates, velocity and timing coordinates of the radio navigation receiver by using a verification device; wherein a verified authentication service is provided.

DESCRIPTION OF THE DRAWINGS

The accompanying drawings, which are incorporated in and form a part of this specification, illustrate embodiments of the technology and, together with the description, serve to explain the principles below.

DETAILED DESCRIPTION

Reference now is made in detail to the embodiments of the technology, examples of which are illustrated in the accompanying drawings. While the present technology will be described in conjunction with the various embodiments, it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific-details are set forth in order to provide a thorough understanding of the presented embodiments. However, it will be obvious to one of ordinary skill in the art that the presented embodiments may be practiced without these specific details. In other instances, well known methods, procedures, components, and circuits have not been described in detail as not to unnecessarily obscure aspects of the presented embodiments.

Figure 1:
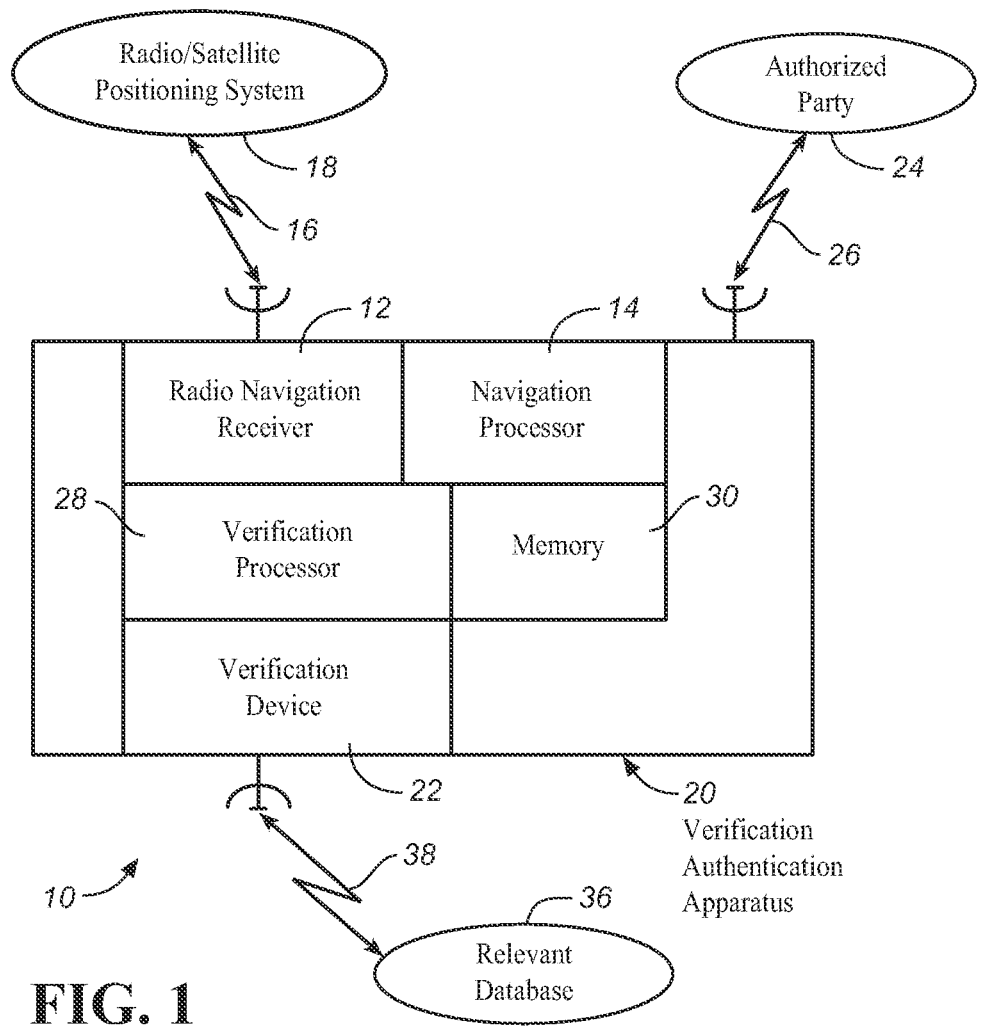
FIG. 1 depicts an apparatus for providing verified authentication services for the purposes of the present technology.

FIG. 1 is a block diagram 10 that illustrates an apparatus 20 for providing verified authentication services for the purposes of the present technology. The verified authentication apparatus 20 comprises: a radio navigation receiver 12, a navigation processor 14, a verification processor 28, a memory block 30, and a verification device 22.

In an embodiment of the present technology, the radio navigation receiver 12 is configured to receive authenticated navigation signals 16 from a radio positioning system 18.

In an embodiment of the present technology, the radio positioning system 18 is selected from the group consisting of: Galileo; GPS: GLONASS; Compass; Quasi-Zenith Satellite System (QZSS); and a pseudolite navigation system.

In an embodiment of the present technology, the radio positioning system 18 can be implemented by using the Global Positioning System (GPS). The GPS is a space-based satellite navigation system that provides location and time information in all weather conditions, anywhere on or near the Earth where there is an unobstructed line of sight to four or more GPS satellites. The system provides critical capabilities to military, civil and commercial users around the world. It is maintained by the United States government and is freely accessible to anyone with a GPS receiver.

The GPS project was developed in 1973 to overcome the limitations of previous navigation systems, integrating ideas from several predecessors, including a number of classified engineering design studies from the 1960s. GPS was created and realized by the U.S. Department of Defense (DoD) and was originally run with 24 satellites. It became fully operational in 1994.

Advances in technology and new demands on the existing system have now led to efforts to modernize the GPS system and implement the next generation of GPS III satellites and Next Generation Operational Control System (OCX). Announcements from the Vice President and the White House in 1998 initiated these changes. In 2000, U.S. Congress authorized the modernization effort, referred to as GPS III.

In an embodiment of the present technology, the radio positioning system 18 can be implemented by using GLONASS or Global Navigation Satellite System. GLONASS is a radio-based satellite navigation system operated for the Russian government by the Russian Aerospace Defense Forces. It both complements and provides an alternative to the United States' Global Positioning System (GPS) and is the only alternative navigational system in operation with global coverage and of comparable precision.

Development of GLONASS began in the Soviet Union in 1976. Beginning on 12 Oct. 1982, numerous rockets launches added satellites to the system until the "constellation" was completed in 1995. During the 2000s, under Vladimir Putin's presidency, the restoration of the system was made a top government priority and funding was substantially increased. GLONASS is the most expensive program of the Russian Federal Space Agency, consuming a third of its budget in 2010.

By 2010, GLONASS had achieved 100% coverage of Russia's territory and in October 2011, the full orbital constellation of 24 satellites was restored, enabling full global coverage. The GLONASS satellites' designs have undergone several upgrades, with the latest version being GLONASS-K.

In an embodiment of the present technology, the radio positioning system 18 can be implemented by using Compass, or the BeiDou Navigation Satellite System (BDS). Compass is a Chinese satellite navigation system. It consists of two separate satellite constellations—a limited test system that has been operating since 2000, and a full-scale global navigation system that is currently under construction.

The first BeiDou system, officially called the BeiDou Satellite Navigation Experimental System and also known as BeiDou-1, consists of three satellites and offers limited coverage and applications. It has been offering navigation services, mainly for customers in China and neighboring regions, since 2000.

The second generation of the system, officially called the BeiDou Satellite Navigation System (BDS) and also known as COMPASS or BeiDou-2, will be a global satellite navigation system consisting of 35 satellites, and is under construction as of January 2013. It became operational in China in December 2011, with 10 satellites in use, and began offering services to customers in the Asia-Pacific region in December 2012. It is planned to begin serving global customers upon its completion in 2020.

In an embodiment of the present technology, the radio positioning system 18 can be implemented by using the Quasi-Zenith Satellite System (QZSS). QZSS is a proposed three-satellite regional time transfer system and Satellite Based Augmentation System for the Global Positioning System, that would be receivable within Japan. The first satellite 'Michibiki' was launched on 11 Sep. 2010. Full operational status is expected by 2013. Authorized by the Japanese government in 2002, work on a concept for a Quasi-Zenith Satellite System (QZSS), began development by the Advanced Space Business Corporation (ASBC) team, including Mitsubishi Electric, Hitachi, and GNSS Technologies Inc. However, ASBC collapsed in 2007. The work was taken over by the Satellite Positioning Research and Application Center. SPAC is owned by four departments of the Japanese government: the Ministry of Education, Culture, Sports, Science and Technology, the Ministry of Internal Affairs and Communications, the Ministry of Economy, Trade and Industry, and the Ministry of Land, Infrastructure and Transport.

QZSS is targeted at mobile applications, to provide communications-based services (video, audio, and data) and positioning information. With regards to its positioning service, QZSS can only provide limited accuracy on its own and is not currently required in its specifications to work in a stand-alone mode. As such, it is viewed as a GNSS Augmentation service. Its positioning service could also collaborate with the geostationary satellites in Japan's Multi-Functional Transport Satellite (MTSAT), currently under development, which itself is a Satellite Based Augmentation System similar to the U.S. Federal Aviation Administration's Wide Area Augmentation System (WAAS).

In an embodiment of the present technology, the radio positioning system 18 can be implemented by using Galileo. Galileo is a global navigation satellite system (GNSS) currently being built by the European Union (EU) and European Space Agency (ESA). The €5 billion project is named after the Italian astronomer Galileo Galilei. One of the aims of Galileo is to provide a high-precision positioning system upon which European nations can rely, independently from the Russian GLONASS, US GPS, and Chinese Compass systems, which can be disabled in times of war or conflict.

When in operation, it will use two ground operations centers near Munich, Germany and in Fucino, Italy. In December 2010, EU ministers in Brussels voted Prague, Czech Republic as the headquarters of the Galileo project. On 21 Oct. 2011, the first two of four operational satellites were launched to validate the system. The next two followed on 12 Oct. 2012, making it "possible to test Galileo end-to-end". Once this In-Orbit Validation (IOV) phase has been completed, additional satellites will be launched to reach Initial Operational Capability (IOC) around mid-decade. Full completion of the 30-satellite Galileo system (27 operational and three active spares) is expected by 2019.

Basic navigation services will be free of charge. Galileo is intended to provide horizontal and vertical position measurements within 1 meter precision and better positioning services at high latitudes than other positioning systems. As a further feature, Galileo will provide a unique global search and rescue (SAR) function. Satellites will be equipped with a transponder which will relay distress signals from the user's transmitter to the Rescue Co-ordination Centre, which will then initiate the rescue operation. At the same time, the system will provide a signal to the users, informing them that their situation has been detected and that help is on the way. This latter feature is new and is considered a major upgrade compared to the existing GPS and GLONASS navigation systems, which do not provide feedback to the user.

The use of basic (low-precision) Galileo services will be free and open to everyone. The high-precision capabilities will be available for paying commercial users (please, see below: authenticated services based on commercial usage of E6 signals) and for military use.

In an embodiment of the present technology, the radio positioning system 18 can be implemented by using a pseudolite. Pseudolite is a contraction of the term "pseudo-satellite," used to refer to something that is not a satellite which performs a function commonly in the domain of satellites. Pseudolites are most often small transceivers that are used to create a local, ground-based GPS alternative. The range of each transceiver's signal is dependent on the power available to the unit.

Being able to deploy one's own positioning system, independent of a radio satellite system, can be useful in situations where the normal satellite signals are either blocked/jammed (military conflicts), or simply not available (exploration of other planets).

In an embodiment of the present technology, after the authenticated radio signal is received by the radio navigation receiver 12, the navigation processor 14 obtains the solution of the set of the simultaneous equations for its unknown coordinates (x0, y0, z0) and for unknown time bias error (cb). The radio-navigation processor 14 can also determine velocity of a verified authentication apparatus 20 if it is placed on a moving platform (not shown).

In an embodiment of the present technology, the navigation receiver 14 is selected from the group consisting of: an autonomous GPS satellite navigation receiver; a differential GPS satellite navigation receiver; an RTK GPS satellite navigation receiver; a Galileo Commercial Services (Galileo CS) E6 frequency signals satellite navigation receiver; and a pseudolite navigation receiver.

In an embodiment of the present technology, the navigation receiver 14 (of FIG. 1) comprises a differential GPS satellite navigation receiver. In differential position determination, many of the errors in the Radio Positioning System (RADPS) signals that compromise the accuracy of absolute position determination are similar in magnitude for stations that are physically close. The effect of these errors on the accuracy of differential position determination is therefore substantially reduced by a process of partial error cancellation. Thus, the differential positioning method is far more accurate than the absolute positioning method, provided that the distances between these stations are substantially less than the distances from these stations to the satellites, which is the usual case. Differential positioning can be used to provide location coordinates and distances that are accurate to within a few centimeters in absolute terms. The differential GPS processor can include: (a) a real time code differential GPS; (b) a post-processing differential GPS; (c) a real-time kinematic (RTK) differential GPS that includes a code and carrier RTK differential GPS processor.

The differential GPS receiver can obtain the differential corrections from different sources. Referring still to FIG. 1, in an embodiment of the present technology, the differential corrections can be obtained from a Base Station (not shown).

The fixed Base Station (BS) placed at a known location determines the range and range-rate measurement errors in each received GPS signal and communicates these measurement errors as corrections to be applied by local users. The Base Station (BS) has its own imprecise clock with the clock bias CBBASE. As a result, the local users are able to obtain more accurate navigation results relative to the Base Station location and the Base Station clock. With proper equipment, a relative accuracy of 5 meters should be possible at distances of a few hundred kilometers from the Base Station.

Referring still to FIG. 1, in an embodiment of the present technology, the radio navigation receiver 12 can be implemented by using a TRIMBLE Ag GPS-132 receiver that obtains the differential corrections from the U. S. Coast Guard service free in 300 kHz band broadcast by using the wireless communication device (not shown) and the wireless communication link (not shown). In this embodiment, the mobile radio positioning system receiver 12 should be placed within (2-300) miles from the U. S. Coast Guard Base Station. The accuracy of this differential GPS method is about 50 cm.

Referring still to FIG. 1, in an embodiment of the present technology, the differential corrections can be obtained from the Wide Area Augmentation System (WAAS). The WAAS system includes a network of Base Stations that uses satellites (initially geostationary satellites-GEOs) to broadcast GPS integrity and correction data to GPS users. The WAAS provides a ranging signal that augments the GPS, which is the WAAS ranging signal, is designed to minimize the standard GPS receiver hardware modifications. The WAAS ranging signal utilizes the GPS frequency and GPS-type of modulation, including only a Coarse/Acquisition (C/A) PRN code. In addition, the code phase timing is synchronized to GPS time to provide a ranging capability. To obtain the position solution, the WAAS satellite can be used as any other GPS satellite in satellite selection algorithm. The WAAS provides the differential corrections free of charge to a WAAS-compatible user. The accuracy of this method is specified at 1.6 meters. Please, see "Wide-Area Augmentation System Performance Analysis Report #41 July 2012," http://www.nstb.tc.faa.gov/reports/waaspan2.pdf Referring still to FIG. 1, in an embodiment of the present technology, the navigation receiver 14 comprising a real time kinematic (RTK) differential GPS processor can obtain the position locations with less than 2 cm accuracy. RTK is a process where GPS signal corrections are transmitted in real time from a reference receiver at a known location to one or more remote rover receivers. The use of an RTK capable GPS system can compensate for atmospheric delay, orbital errors and other variables in GPS geometry, increasing positioning accuracy up to within a centimeter. Used by engineers, topographers, surveyors and other professionals, RTK is a technique employed in applications where precision is paramount. RTK is used, not only as a precision positioning instrument, but also as a core for navigation systems or automatic machine guidance, in applications such as civil engineering and dredging. It provides advantages over other traditional positioning and tracking methods, increasing productivity and accuracy. Using the code phase of GPS signals, as well as the carrier phase, which delivers the most accurate GPS information, RTK provides differential corrections to produce the most precise GPS positioning.

Referring still to FIG. 1, in an embodiment of the present technology, differential GPS radio navigation receiver can obtain the differential corrections from the Virtual Base Station (VBS) (not shown radio navigation receiver) by using the wireless communication device (not shown) and the wireless communication link (not shown).

Indeed, the Virtual Base Station (VBS) is configured to deliver a network-created correction data to a multiplicity of rovers via a concatenated communications link consisting of a single cellular connection, and a radio transmission or broadcasting system. The location of the radio transmitting system can be co-located with a GPS Base Station designated as the position of the local Virtual Reference Station. This GPS Base Station determines its position using GPS, and transmits its location to the VRS Base Station via a cellular link between the local GPS Base Station and the VRS Base Station. It enables the VRS Base Station to generate differential corrections as if such differential corrections were actually being generated at the real GPS Base Station location.

Referring still to FIG. 1, in an embodiment of the present technology, the radio navigation receiver 12 can be implemented by using a pseudolite. The pseudolite comprises a ground based radio positioning system working in any radio frequency including but not limited to the GPS frequencies and the ISM (industrial scientific medical) unlicensed operation band, including 900 MHZ, 2.4 GHz, or 5.8 GHz bands ISM bands, or in a radio location band such as the (9.5-10) GHz band. Pseudolites can be used for enhancing the GPS by providing increased accuracy, integrity, and availability. The complete description of the pseudolite transmitters in GPS band can be found in "Global Positioning System: Theory and Applications"; Volume II, edited by Bradford W. Parkinson and James J. Spilker Jr., and published in Volume 164 in "PROGRESS IN ASTRONAUTICS AND AERONAUTICS", by American Institute of Aeronautics and Astronautics, Inc., in 1966. For the purposes of the present technology, the pseudolite manufactured by Locata (Canberra, Australia) and Novariant (Menlo Park, Calif.) can be used.

Referring still to FIG. 1, in an embodiment of the present technology, the radio navigation receiver 12 can be implemented by using TRE-G3T-E E6-band receiver that is capable of tracking E6 B/C signal from all launched Galileo satellites. E6 B/C signal can be used for real time authentication services depending on personal positioning, timing and velocity information.

Indeed, the real time authentication service is foreseen as one application of the Commercial Service of the EC Galileo program. Mobile and car applications and services involving payments and depending on personal positioning, timing and velocity need the authentication of not only the navigation method but also the position.

However, the threats from hackers such as spoofing and meaconing (the interception and rebroadcast of navigation signals) need to be addressed to provide the genuine (verified) authentication services.

Referring still to FIG. 1, in an embodiment of the present technology, the verification processor 28 (including the memory block 30) is configured to verify reliability of the obtained position coordinates, velocity and timing coordinates by using a plurality of parameters selected from the group consisting of: an identification number of the radio navigation receiver 14; and a predetermined password configured to lock/unlock said navigation receiver 14. The verification processor 28 can be implemented by using a general purpose processor or by using an ASIC (Application Specific Integrated Circuit).

Referring still to FIG. 1, in an embodiment of the present technology, the verification device 22 is configured to verify reliability of the obtained position coordinates, velocity and timing coordinates by using a plurality of identification (id) parameters associated with a user of the verified authentication apparatus 20.

Referring still to FIG. 1, in an embodiment of the present technology, the verification device 22 is configured to verify reliability of the obtained position coordinates, velocity and timing coordinates by using a plurality of id parameters selected from the group consisting of: a set of fingerprints of the user; a set of eye scans of the user; a photo identification of the user; and a voice identification of the user.

Referring still to FIG. 1, in an embodiment of the present technology, the verification device 22 includes a live scan fingerprinting apparatus (not shown) that is configured to capture fingerprints and palm prints of the user electronically, without the need for the more traditional method of ink and paper.

In this embodiment of the present technology, the live scan fingerprinting apparatus inputs the obtained images of the fingerprints into the verification processor 28.

In an embodiment of the present technology, the obtained images of the fingerprints can be checked against the relevant database 36 (for an extra fee) to make sure that the user has no criminal record, if the criminal record is relevant for the purposes of providing the verified authentication services.

For example, in the United States, most law enforcement agencies use live scan as their primary tool in the recognition of human individuals. Live scan results can be verified and returned to the source within 72 hours of transmission.

In another example, in the UK, many major police custody suites are now equipped with live scan machines, which allow for suspects' fingerprints to be instantly compared with a national database, IDENT1, with results usually reported in less than ten minutes.

Referring still to FIG. 1, in an embodiment of the present technology, the verification device 22 includes a retinal scan apparatus (not shown) that uses the unique patterns on a person's retina to identify them. It is not to be confused with another ocular-based technology, iris recognition.

The human retina is a thin tissue composed of neural cells that is located in the posterior portion of the eye. Because of the complex structure of the capillaries that supply the retina with blood, each person's retina is unique. The network of blood vessels in the retina is so complex that even identical twins do not share a similar pattern.

Although retinal patterns may be altered in cases of diabetes, glaucoma or retinal degenerative disorders, the retina typically remains unchanged from birth until death. Due to its unique and unchanging nature, the retina appears to be the most precise and reliable biometric. Advocates of retinal scanning have concluded that it is so accurate that its error rate is estimated to be only one in a million.

A biometric identifier known as a retinal scan is used to map the unique patterns of a person's retina. The blood vessels within the retina absorb light more readily than the surrounding tissue and are easily identified with appropriate lighting. A retinal scan is performed by casting an unperceived beam of low-energy infrared light into a person's eye as they look through the scanner's eyepiece. This beam of light traces a standardized path on the retina. Because retinal blood vessels are more absorbent of this light than the rest of the eye, the amount of reflection varies during the scan. The pattern of variations is converted to computer code and stored in a database.

In an embodiment of the present technology, the retinal scans apparatus (not shown) inputs images of patterns on a person's retina into the verification processor 28.

In an embodiment of the present technology, the obtained patterns on a person's retina can be checked against the relevant database 36 (for an extra fee) to make sure that the user has no criminal record, if the criminal record is relevant for the purposes of providing the verified authentication services.

For example, retinal scanning has been utilized by several government agencies including the FBI, CIA, and NASA. Retinal scanning has been used in prisons, for ATM identity verification and the prevention of welfare fraud.

In an embodiment of the present technology, retinal scanning also can be used to check the medical history of the user of the verified authentication apparatus 20 if the medical history is relevant for the purposes of providing the verified authentication services.

For example, communicable illnesses such as AIDS, syphilis, malaria, chicken pox and Lyme disease as well as hereditary diseases like leukemia, lymphoma, and sickle cell anemia impact the eyes. Pregnancy also affects the eyes. Likewise, indications of chronic health conditions such as congestive heart failure, atherosclerosis, and cholesterol issues first appear in the eyes.

Referring still to FIG. 1, in an embodiment of the present technology, the verification device 22 includes a voice recognition apparatus (not shown) that uses the speaking characteristics of the voice (voice biometrics), also called voice recognition to identify the person.

Speaker recognition has a history dating back some four decades and uses the acoustic features of speech that have been found to differ between individuals. These acoustic patterns reflect both anatomy (e.g., size and shape of the throat and mouth) and learned behavioral patterns (e.g., voice pitch, speaking style). Speaker verification has earned speaker recognition its classification as a "behavioral biometric".

There are two major applications of speaker recognition technologies and methodologies. If the speaker claims to be of a certain identity and the voice is used to verify this claim, this is called verification or authentication. On the other hand, identification is the task of determining an unknown speaker's identity.

The speaker verification is a 1:1 match where one speaker's voice is matched to one template (also called a "voice print" or "voice model") whereas the speaker identification is a 1:N match where the voice is compared against N templates.

Each speaker recognition system has two phases: Enrollment and verification. During enrollment, the speaker's voice is recorded and typically a number of features are extracted to form a voice print, template, or model. In the verification phase, a speech sample or "utterance" is compared against a previously created voice print. For identification systems, the utterance is compared against multiple voice prints in order to determine the best match while verification systems compare an utterance against a single voice print. Because of the process involved, verification is faster than identification.

Speaker recognition systems fall into two categories: text-dependent and text-independent. If the text must be the same for enrollment and verification this is called text-dependent recognition. In a text-dependent system, prompts can either be common across all speakers (e.g.: a common pass phrase) or unique. In addition, the use of shared-secrets (e.g.: passwords and PINs) or knowledge-based information can be employed in order to create a multi-factor authentication scenario.

Text-independent systems are most often used for speaker identification as they require very little if any cooperation by the speaker. In this case the text during enrollment and test is different. In fact, the enrollment may happen without the user's knowledge, as in the case for many forensic applications. As text-independent technologies do not compare what was said at enrollment and verification, verification applications tend to also employ speech recognition to determine what the user is saying at the point of authentication. In text independent systems both acoustics and speech analysis techniques are used.

The various technologies used to process and store voice prints include frequency estimation, hidden Markov models, Gaussian mixture models, pattern matching algorithms, neural networks, matrix representation, Vector Quantization and decision trees. Some systems also use "anti-speaker" techniques, such as cohort models, and world models.

Ambient noise levels can impede both collections of the initial and subsequent voice samples. Noise reduction algorithms can be employed to improve accuracy, but incorrect application can have the opposite effect.

Performance degradation can result from changes in behavioral attributes of the voice and from enrolment using one telephone and verification on another telephone (cross channel). Integration with two-factor authentication products is expected to increase. Voice changes due to ageing may impact system performance over time. Some systems adapt the speaker models after every successful verification to capture such long-term changes in the voice, though there is debate regarding the overall security impact imposed by automated adaptation.

The technology traditionally uses existing microphones and voice transmission technology allowing recognition over long distances via ordinary telephones (wired or wireless). Digitally recorded audio voice identification and analogue recorded voice identification uses electronic measurements as well as critical listening skills that must be applied by a forensic expert in order for the identification to be accurate.

I. Verified Authentication Confirmation Service for Legal Proof of Physical Location Appointments.

When there is a legal court appointment, the person needs to be in one place at certain time. However, sometimes these appointments are just very brief appointments needed just to prove a person's presence in a city that is to prove that the person didn't escape.

Using the conventional technology, a person needs to be physically present at the Court and sign a paper or a digital document.

Figure 2:
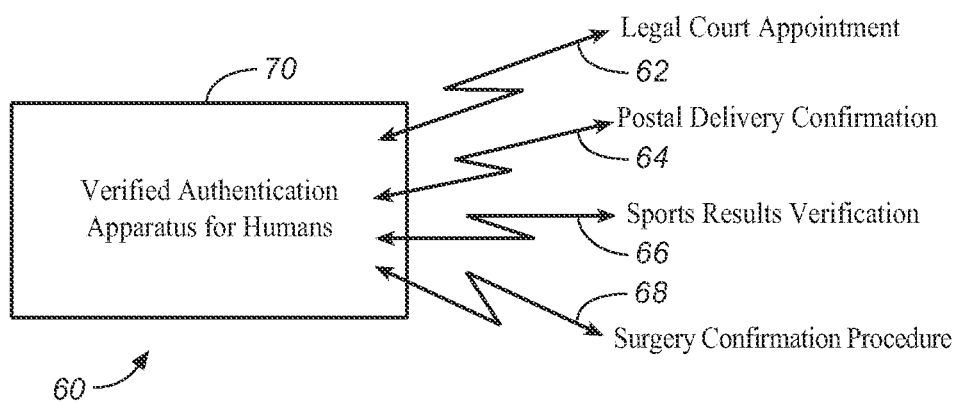
FIG. 2 illustrates a plurality of verified authenticated services for personal use provided upon authorized request by using the apparatus of the present technology of FIG. 1.

In an embodiment of the present technology, the verified authentication apparatus 20 (of FIG. 1) can be used to verify the presence of a person of interest at the certain place at the certain time without having this person to actually appear at the Court, as shown in arrow 62 of diagram 60 of FIG. 2.

In an embodiment of the present technology, the verified authentication apparatus 20 (of FIG. 1) can employ the Galileo Commercial Services (Galileo CS) E6 frequency signals satellite receiver 12 and a navigation processor 14 configured to track and to receive the Galileo CS E6 frequency signals. By using the tracked Galileo CS E6 frequency signals, the navigation processor 14 can determine the timing coordinates and the position coordinates of the person of interest.

Referring still to FIG. 1, in an embodiment of the present technology, to provide the genuine authentication services the authentication is verified by using at least two layers of protection: (i) range code encryption to authenticate the navigation signal; and (ii) information in the verified authentication apparatus 20.

Range code encryption allows the authentication of the E6 signal transferred from Galileo satellites to receivers. The navigation signal is transmitted through a cryptographic key secure enough to assure a high degree of reliability. This layer of protection, once developed, through the right choices of cryptographic technology and mitigating plan for hackers, could enable trustable mobile GNSS-based applications and services. However, it is needed another layer of protection for entrust the authenticity of the position calculated. Hackers could indeed modify the E6 signal after the signal has been received.

In an embodiment of the present technology, another layer of hacker-proof protection (of FIG. 1) can be implemented by using a smartphone having finger scanning capabilities to prove the identity of person of interest. Thus, the verification processor 28 can verify the presence of the person of interest at certain place at the certain time and send the verification information to an authorized party 24 (in this example, to the Court) upon request.

In an embodiment of the present technology, because the position of the person of interest in this particular case can be determined with meter accuracy, the verified authentication apparatus 20 (of FIG. 1) can employ a less accurate GPS receiver 12 and autonomous GPS navigation processor to determine the timing coordinates and the position coordinates of the person of interest.

In an embodiment of the present technology, the verification device 22 (of FIG. 1) can be implemented by using a smartphone having voice recognition capabilities to prove the identity of person of interest. Thus, the verification processor 28 can verify the presence of the person of interest at certain place at the certain time and send the verification information to an authorized party 24 (in this example, to the Court) upon request.

In an embodiment of the present technology, the verification device 22 (of FIG. 1) can be implemented by using an eye-scanning recognition technology if one needs to provide the authorized party his/her presence at a top secret location.

In this embodiment of the present technology, the verification device 22 includes an eye-scanning apparatus to prove the identity of person of interest. Thus, the verification processor 28 can verify the presence of the person of interest at the top-secret location place at the certain time and send the verification information to an authorized party 24 upon request.

II. Verified Authentication Confirmation Service for Package Delivery.

The issue is how to prove that a package or letter has been delivered in the right place and at the right time. The only option available today to prove that a package or a letter has been indeed delivered is by using a signature in hard copy or in a digital format of the person that the package or letter has been indeed delivered at the right time at the predetermined address. However, if a person is not physically available to receive the package and sign the receipt there is a problem to prove that the package has been indeed delivered at the right address and at the proper time.

In an embodiment of the present technology, the verified authentication apparatus 20 (of FIG. 1) can be used to verify the delivery of a package, letter, shipment, etc. at the certain address and at the certain time without having the person to be actually present at the time of delivery, as shown in arrow 64 of diagram 60 of FIG. 2.

In an embodiment of the present technology, the verified authentication apparatus 20 (of FIG. 1) can employ the Galileo Commercial Services (Galileo CS) E6 frequency signals satellite receiver 12 and a navigation processor 14 configured to track and to receive the Galileo CS E6 frequency signals. By using the tracked Galileo CS E6 frequency signals, the navigation processor 14 can determine the timing coordinates and the position coordinates of the delivered package.

In an embodiment of the present technology, because the position of the delivery address in this particular case can be determined with the meter accuracy, the verified authentication apparatus 20 (of FIG. 1) can employ a less accurate GPS receiver 12 and autonomous GPS navigation processor to determine the timing coordinates and the position coordinates of package delivery. This approach could be used for freight companies, shipping companies, USPS postal delivery, UPS delivery, FedEx delivery, etc.

III. Verified Authentication Confirmation Service for Position and Timing for Inspection Jobs.

The inspection jobs require assurances that an authorized inspector was doing the inspection job at the right place and at the proper time. Nowadays, the inspection of utilities like pipelines, water pipes, is done with a GPS. However, an autonomous GPS has at most meter accuracy, whereas pipes dimensions could be much smaller. Thus, the GPS approach does not guarantee any reliability in inspection information. Also, the identity of an inspector is not verified.

Another option nowadays is to use GPS differential in post processing that has better accuracy. However, this approach requires a post processing office and a GPS reference station.

In an embodiment of the present technology, the verified authentication apparatus 20 (of FIG. 1) can be used to verify that the inspection job was indeed performed by an authorized inspector with a predetermined accuracy.

In an embodiment of the present technology, the verified authentication apparatus 20 (of FIG. 1) can employ the Galileo Commercial Services (Galileo CS) E6 frequency signals satellite receiver 12 and a navigation processor 14 configured to track and to receive the Galileo CS E6 frequency signals. By using the tracked Galileo CS E6 frequency signals, the navigation processor 14 can determine the timing coordinates of an inspection job and the coordinates of an inspection object with at least differential GPS accuracy but without need for a Base station and without the need for the post-processing.

As was explained above, the range code encryption allows the authentication of the E6 signal transferred from Galileo satellites to receivers. The navigation signal is transmitted through a cryptographic key secure enough to assure a high degree of reliability.

In an embodiment of the present technology, another layer of hacker-proof protection (of FIG. 1) can be implemented by using a smartphone having finger scanning capabilities to prove the identity of the inspector. Thus, the verification processor 28 can verify that an authorized inspector has indeed performed the inspection job with the predetermined accuracy at the proper time and can send the verification information to an authorized party 24 upon request.

IV. Verified Authentication Confirmation Service for Sporting Events.

In professional race sports which require to go through check points like Paris-Dakar, rallies, etc. it is a problem to be sure the cars or motorbikes have actually passed through the check points, otherwise they will be disqualified.

The current solutions have shortcomings. Indeed, the current approach requires the race cars participating in the race to pass through the check points. The check pints locations are verified by using GPS, but a race car is not authenticated so technically there is no guarantee that a certain car indeed passed the check point at a certain point in time. Alternatively, another prior art approach is to use people to manually check every car. This approach requires investment and expenses.

In an embodiment of the present technology, the verified authentication apparatus 20 (of FIG. 1) can be used to verify that every race car during the race indeed passed all check points and the timing of passing all check points can be transmitted in real time to the relevant database.

In an embodiment of the present technology, the verified authentication apparatus 20 (of FIG. 1) can employ the Galileo Commercial Services (Galileo CS) E6 frequency signals satellite receiver 12 and a navigation processor 14 configured to track and to receive the Galileo CS E6 frequency signals. By using the tracked Galileo CS E6 frequency signals, the navigation processor 14 can determine the timing coordinates of any car passing all relevant check points.

As was explained above, the range code encryption allows the authentication of the E6 signal transferred from Galileo satellites to receivers. The navigation signal is transmitted through a cryptographic key secure enough to assure a high degree of reliability.

In an embodiment of the present technology, another layer of hacker-proof protection (of FIG. 1) can be implemented by using a smartphone having finger scanning capabilities to prove the identity of the driver. Thus, the verification processor 28 can verify that an authorized driver has indeed passed all check points during the race. In addition, the identity of a race car can be also verified by using the car identification number. The collected verification information relevant to the race can be sent to an authorized party 24 upon request.

V. Verified Authentication Confirmation Service for Assurances of Proper Patient and Proper Operational Procedure on Proper Organ During Surgery.

According to recently available statistics, reported by John Bonifield, CNN and Elizabeth Cohen, CNN Senior Medical Correspondent and updated on Jun. 10, 2012, medical errors kill more than 250,000 people in the United States yearly.

"Mistakes are happening every day in every hospital in the country that we're just not catching," says Dr. Albert Wu, an internist at Johns Hopkins Hospital. Medical errors kill more than a quarter million people every year in the United States and injure millions. Add them all up and "you have probably the third leading cause of death" in the country, says Dr. Peter Pronovost, an anesthesiologist and critical care physician at Johns Hopkins Hospital.

Here's a list of 10 shocking medical mistakes. (1) Treating the wrong patient. (2) Surgical staff miscounts (or fails to count) equipment used inside a patient during an operation. (3) Patients with dementia are left prone to wandering. (4) Con artists pretend to be doctors. (5) Emergency rooms get backed up when overcrowded hospitals don't have enough beds. (6) Air bubbles in blood because the hole in a patient's chest isn't sealed airtight after a chest tube is removed. (7) Operating on the wrong body part. (8) Infection infestation because doctors and nurses don't wash their hands. (9) Lookalike tubes are mixed up, like a chest tube and a feeding tube that can look a lot alike. (10) Patient is waking up during surgery because of an under-dose of anesthesia.

In an embodiment of the present technology, the verified authentication apparatus 70 (of FIG. 2) can be used to address some of these errors and to prevent many easily preventable deaths (please, see arrow 68 of FIG. 2).

In an embodiment of the present technology, the data relevant to the patient procedure including the identity of a patient, his/her medical insurance information, the exact nature of the procedure to be performed, the name of the surgeon, the updated surgeon ID information, the exact timing of the start of the procedure and the expected duration of the procedure, the specific part of the patient body to be operated on, the type of the anesthetic, the expected duration of the anesthesia, the name of the anesthesiologist, the updated ID of the anesthesiologist, etc. is entered into the relevant database 36 (of FIG. 1) prior to the procedure.

In an embodiment of the present technology, the verified authentication apparatus 20 (of FIG. 1) can employ the Galileo Commercial Services (Galileo CS) E6 frequency signals satellite receiver 12 and a navigation processor 14 configured to track and to receive the Galileo CS E6 frequency signals. By using the tracked Galileo CS E6 frequency signals, the navigation processor 14 can determine the prescheduled timing of a patient procedure for a patient that is brought into an operation suite and the exact location of the operation suite. If the time of the procedure is rescheduled due to the hospital emergencies, the updated timing of the start of the procedure is entered into the database, and is accessed by the verified authentication apparatus 20 (of FIG. 1). The exact duration of the anesthesia can be also verified so that a patient would not wake up during the procedure.

In an embodiment of the present technology, an operation table is placed into the reference coordinate system. By using the tracked Galileo CS E6 frequency signals, the navigation processor 14 can determine the exact location of the part the patient body located on the operation table that is subject to the operation procedure. If a surgeon attempts to operate on another part of the body, the verification processor can send a signal to an authorized party 24 (of FIG. 1). The authorized party will have an opportunity to take immediate action to prevent the medical error from happening.

As was explained above, the range code encryption allows the authentication of the E6 signal transferred from Galileo satellites to receivers. The navigation signal is transmitted through a cryptographic key secure enough to assure a high degree of reliability.

In an embodiment of the present technology, a verification device 22 can be used to verify the identity of the patient. The identity and fingerprints of the patient are downloaded from the relevant database 36 immediately prior to the procedure. In one embodiment of the present technology, a smartphone having finger scanning capabilities can be used to prove the identity of the patient.

In an embodiment of the present technology, a verification device 22 is used to verify the identity of the surgeon. The identity and fingerprints of the surgeon are downloaded from the relevant database 36 immediately prior to the procedure. In one embodiment of the present technology, a smartphone having finger scanning capabilities can be used to prove the identity of the surgeon.

In an embodiment of the present technology, a verification device 22 can be utilized to verify the identity of the anesthesiologist. The identity and fingerprints of the anesthesiologist are downloaded from the relevant database 36 immediately prior to the procedure. In one embodiment of the present technology, a smartphone having finger scanning capabilities can be used to prove the identity of the anesthesiologist.

As discussed above, the verification device 22 of FIG. 1 can be used to prevent from happening the following medical errors: how to avoid treating a wrong patient; how to avoid operating on a wrong body part; how to prevent a con-artist to impersonate a surgeon or an anesthesiologist; how to make sure that the duration of the anesthesia is such that a patient would not wake up during the procedure.

VI. Verified Authentication Confirmation Service for Robotically Driven Cars.

The Google driverless car is a project by Google that involves developing technology for driverless cars. The project is currently being led by Google engineer Sebastian Thrun, director of the Stanford Artificial Intelligence Laboratory and co-inventor of Google Street View. Thrun's team at Stanford created the robotic vehicle Stanley which won the 2005 DARPA Grand Challenge and its US$2 million prize from the United States Department of Defense. The team developing the system consisted of 15 engineers working for Google, including Chris Urmson, Mike Montemerlo, and Anthony Levandowski who had worked on the DARPA Grand and Urban Challenges. The U.S. state of Nevada passed a law on Jun. 29, 2011 permitting the operation of driverless cars in Nevada. Google had been lobbying for driverless car laws. The Nevada law went into effect on Mar. 1, 2012, and the Nevada Department of Motor Vehicles issued the first license for a self-driven car in May 2012. The license was issued to a Toyota Prius modified with Google's experimental driverless technology.

Figure 3:
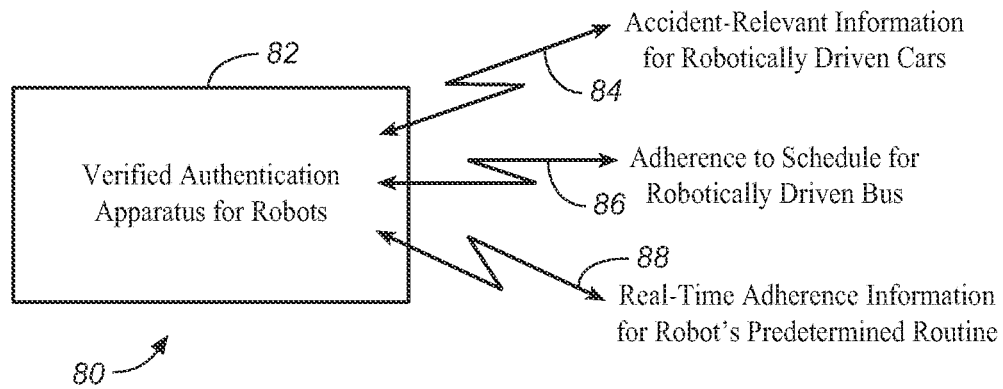
FIG. 3 shows a plurality of verified authenticated services for robots (or mobile machines) provided upon authorized request by using the apparatus of the present technology of FIG. 1.

In an embodiment of the present technology, a verification device 80 of FIG. 3 can be used to provide the insurance related data to an authorized party for the Robotically Driven Cars that utilize the Google's experimental driverless technology (arrow 84 of FIG. 3) in case of accidents involving at least one driverless car.

More specifically, in an embodiment of the present technology, the verified authentication apparatus 20 (of FIG. 1) can be used to provide and record the velocity, location, and timing data for a robotically driven car for the actual driving path of a robotically driven car.

Indeed, in an embodiment of the present technology, the verified authentication apparatus 20 (of FIG. 1) can employ the Galileo Commercial Services (Galileo CS) E6 frequency signals satellite receiver 12 and a navigation processor 14 configured to track and to receive the Galileo CS E6 frequency signals. By using the tracked Galileo CS E6 frequency signals, the navigation processor 14 can determine the timing coordinates, velocity, and location for the actual driving path of a robotically driven car.

As was explained above, the range code encryption allows the authentication of the E6 signal transferred from Galileo satellites to receivers. The navigation signal is transmitted through a cryptographic key secure enough to assure a high degree of reliability.

In an embodiment of the present technology, another layer of hacker-proof protection (of FIG. 1) can be implemented by using a verification device 22 that compares the identification number of the robotically driven car downloaded from the relevant database 36 with the actual identification number.

In an embodiment of the present technology, the verification processor 28 can record the obtained driving data using the memory 30 and provide the data to the authorized party 24 upon request.

VII. Verified Authentication Confirmation Service for Providing Real-Time Authentication Information of Adherence to Schedule by Robotically Driven Bus.

The driverless car technology can be used in not too distant future to drive a passenger bus. In an embodiment of the present technology, a verification device 80 of FIG. 3 can be used to provide the real time authentication information of adherence to schedule by a Robotically Driven Bus (arrow 86 of FIG. 3) to an authorized party 24 (of FIG. 1).

More specifically, in an embodiment of the present technology, the verified authentication apparatus 20 (of FIG. 1) can be used to provide and record the velocity, location, and timing data for a robotically driven bus for the actual driving path of a robotically driven bus.

Indeed, in an embodiment of the present technology, the verified authentication apparatus 20 (of FIG. 1) can employ the Galileo Commercial Services (Galileo CS) E6 frequency signals satellite receiver 12 and a navigation processor 14 configured to track and to receive the Galileo CS E6 frequency signals. By using the tracked Galileo CS E6 frequency signals, the navigation processor 14 can determine the timing coordinates, velocity, and location for the actual driving path of a robotically driven bus.

As was explained above, the range code encryption allows the authentication of the E6 signal transferred from Galileo satellites to receivers. The navigation signal is transmitted through a cryptographic key secure enough to assure a high degree of reliability.

In an embodiment of the present technology, another layer of hacker-proof protection (of FIG. 1) can be implemented by using a verification device 22 that compares the identification number of the robotically driven bus downloaded from the relevant database 36 with the actual identification number.

In an embodiment of the present technology, the verification processor 28 can record the obtained driving data using the memory 30 and compare the actual bus schedule with the published schedule that is downloaded from the relevant database 36. In case of schedule discrepancies, the authorized party 24 can be notified.

VIII. Verified Authentication Confirmation Service for Providing Authentication Information of Adherence to Predetermined Routine by Service Robot.

A domestic robot (or a domestic mobile machine) is a robot (or a domestic mobile machine) used for household chores. Thus far, there are only a few limited models, though science fiction writers and other speculators have suggested that they could become more common in the future. For example, in 2006, Bill Gates wrote an article for *Scientific American* titled "A Robot in Every Home", supporting this idea. The term "a mobile machine" should be understood as such, whereas "a robot" should be understood as a more specified mobile machine configured to perform at least one useful and tangible function by using preprogrammed instructions.

Many domestic robots (or mobile machines) are used for basic household chores, such as the Electrolux Trilobite, Roomba and the SLAM based Neato Robotics vacuum cleaner robot. Others are educational or entertainment robots, such as the HERO line of the 1980s or the AIBO. While most domestic robots are simplistic, some are connected to Wi-Fi home networks or smart environments and are autonomous to a high degree. There were an estimated 3,540,000 service robots in use in 2006, compared with an estimated 950,000 industrial robots.

In an embodiment of the present technology, a verification device 80 of FIG. 3 can be used to provide authentication information of adherence to predetermined routine by service robots (or mobile machines) (arrow 88 of FIG. 3).

In an embodiment of the present technology, the verified authentication apparatus 20 (of FIG. 1) can employ a pseudolite radio receiver 12 and a navigation processor 14 configured to track and to receive the pseudolite radio signals. The usage of at least one pseudolite in this embodiment is preferable as the service robots work indoors and satellite signals are not readily available under these conditions. On the other hand, a pseudolite can be easily installed in a household where there is at least one service robot. By using the tracked pseudolite signals, the navigation processor 14 can determine the timing coordinates, and location of the service robot.

In an embodiment of the present technology, another layer of hacker-proof protection (of FIG. 1) can be implemented by using a verification device 22 that compares the identification number of the service robot (downloaded from the relevant database 36) with the actual identification number of the robot.

In an embodiment of the present technology, the verification processor 28 can record the obtained timing and positioning data using the memory 30 and provide the data to the authorized party 24 upon request.

Figure 4:
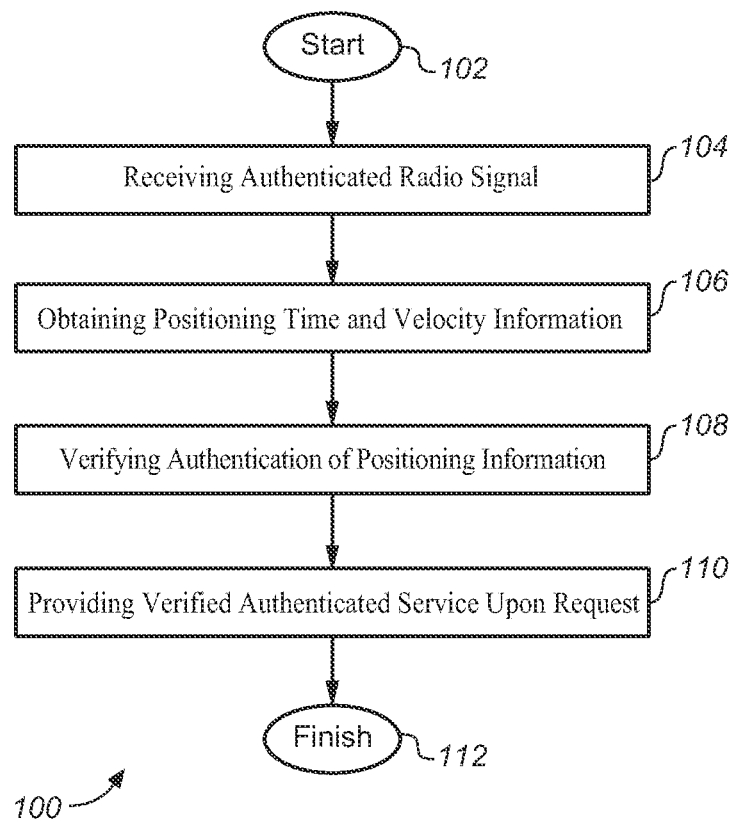
FIG. 4 is a flow chart of the method of the present technology for providing verified authentication services.

As shown in the flow chart 100 of FIG. 4, in an embodiment of the present technology, in operation, the verified authentication apparatus 20 (of FIG. 1) performed the following general steps to provide verified authenticated service.

At the step 104, the authenticated radio signals are received by using the radio navigation receiver 12. At the step 106, the positioning, timing and (when necessary) the velocity information relevant to the requested service is obtained by using the navigation processor 14. At step 108 the authentication of the obtained positioning information is verified by using the verification device 22 that uses the ID data to prevent fraudulent uses of the authenticated positioning information. Finally, at step 110, the fee-based verified authentication service is provided upon request and upon paying the predetermined fee.

The above discussion has set forth the operation of various exemplary systems and devices, as well as various embodiments pertaining to exemplary methods of operating such systems and devices. In various embodiments, one or more steps of a method of implementation are carried out by a processor under the control of computer-readable and computer-executable instructions. Thus, in some embodiments, these methods are implemented via a computer.

In an embodiment, the computer-readable and computer-executable instructions may reside on computer useable/readable media.

Therefore, one or more operations of various embodiments may be controlled or implemented using computer-executable instructions, such as program modules, being executed by a computer. Generally, program modules include routines, programs, objects, components, data structures, etc., that perform particular tasks or implement particular abstract data types. In addition, the present technology may also be practiced in distributed computing environments where tasks are performed by remote processing devices that are linked through a communications network. In a distributed computing environment, program modules may be located in both local and remote non-transitory computer-storage media including memory-storage devices.

Although specific steps of exemplary methods of implementation are disclosed herein, these steps are examples of steps that may be performed in accordance with various exemplary embodiments. That is, embodiments disclosed herein are well suited to performing various other steps or variations of the steps recited. Moreover, the steps disclosed herein may be performed in an order different than presented, and not all of the steps are necessarily performed in a particular embodiment.

Although various electronic and software based systems are discussed herein, these systems are merely examples of environments that might be utilized, and are not intended to suggest any limitation as to the scope of use or functionality of the present technology. Neither should such systems be interpreted as having any dependency or relation to any one or combination of components or functions illustrated in the disclosed examples.

Although the subject matter has been described in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A method for providing verified authentication services by using an authentication system, the method comprising:
   receiving a navigation signal transmitted from a radio-positioning system by using a GNSS receiver that is part of the authentication system;
   calculating position coordinates and/or velocity of the GNSS receiver at a certain time based on the navigation signal by using a navigation processor that is part of the authentication system;
   authenticating the navigation signal that has been transmitted using range code encryption using the authentication system;
   receiving an input from a user of the authentication system at the certain time, wherein the input from the user comprises a fingerprint of the user, an eye scan of the user, a photo identification of the use, or a voice identification of the user;
   verifying reliability of the position coordinates, and/or velocity, of the GNSS receiver calculated by the navigation processor based on verifying an identity of the user accessing the authentication system, wherein the identity of the user is verified based on the input from the user at the certain time by using a verification device that is part of the authentication system, wherein the verification device is a smartphone;
   providing a plurality of authentication personal services for verification of:
      a proper patient,
      a proper operational procedure, and
      a proper body part of the proper patient that is subject to the proper operational procedure by:
         calculating, based on the navigational signal, a location of an operating suite to perform an operational procedure;
         calculating, based on the navigation signal, a location of a body part that is subject to the operational procedure, wherein:
            the location of the body part is calculated in relation to an operation table placed in a coordinate system in the operating suite; and
         calculating, based on the navigation signal, a timing of the operational procedure.

2. The method of claim 1, wherein the radio-positioning system is a pseudolite navigation system.

3. The method of claim 1, wherein the GNSS receiver is a real time kinematic (RTK) GPS satellite navigation receiver.

4. The method of claim 1, wherein:
   verifying reliability of the position coordinates, and/or velocity, of the GNSS receiver further comprises verifying reliability of the position coordinates, and/or velocity, by using a plurality of parameters associated with the GNSS receiver; and
   at least one of the plurality of parameters associated with the GNSS receiver is selected from the group consisting of: an identification number of the navigation processor and a predetermined password configured to lock/unlock GNSS receiver.

5. The method of claim 4, wherein:
   the user is the proper patient;
   the method further comprises receiving input from a surgeon to confirm identity of the surgeon; and
   the surgeon is scheduled to perform the proper operational procedure.

6. The method of claim 1, further comprising verifying reliability of the position coordinates, and/or velocity, of the GNSS receiver by using a plurality of identification (id) parameters associated with the user.

7. The method of claim 5, the method further comprising receiving a fingerprint of an anesthesiologist to confirm identity of the anesthesiologist, wherein the anesthesiologist is to administer anesthetic for the proper operational procedure.

8. The method of claim 1, further comprising providing an authentication service that determines the position coordinates, and/or velocity, of the GNSS receiver periodically within a time range.

9. The method of claim 1, further comprising providing an authentication service that determines the position coordinates, and/or velocity, of the GNSS receiver aperiodically within a time range.

10. The method of claim 1 further comprising querying a database to verify the identity of the user using the input from the user.

11. The method of claim 1 further comprising transmitting information regarding verifying reliability of the position coordinates, and/or velocity, to an authorized party based on a surgeon attempting to operate on a body part other than the proper body part of the proper patient.

12. An authentication device for providing verified authentication services comprising:
a GNSS receiver for receiving a navigation signal transmitted from a radio-positioning system;
a processor for:
calculating position coordinates, and/or velocity, of the GNSS receiver at a certain time based on the navigation signal;
authenticating the navigation signal that has been transmitted using range code encryption; and
a verification device for verifying reliability of the position coordinates, and/or velocity, calculated by the processor based on verifying an identity of a user accessing the authentication device, wherein the identity of the user is verified based on input received from the user of the authentication device at the certain time; and
the verification device is configured to:
providing a plurality of authentication personal services for verification of:
a proper patient,
a proper operational procedure, and
a proper body part of the proper patient that is subject to the proper operational procedure by:
calculating, based on the navigational signal, a location of an operating suite to perform an operational procedure;
calculating, based on the navigation signal, a location of a body part that is subject to the operational procedure, wherein:
the location of the body part is calculated in relation to an operation table placed in a coordinate system in the operating suite; and
calculating, based on the navigation signal, a timing of the operational procedure.

13. The authentication device of claim 12, wherein the GNSS receiver is configured to receive radio signals from a pseudolite navigation system.

14. The authentication device of claim 12, wherein the GNSS receiver is a differential GPS satellite navigation receiver.

15. The authentication device of claim 12, wherein the verification device is configured to verify reliability of the position coordinates, and/or velocity, by using a plurality of parameters associated with the GNSS receiver, wherein at least one of the plurality of parameters is selected from the group consisting of: an identification number of the GNSS receiver; and a predetermined password configured to lock/unlock the GNSS receiver.

16. The authentication device of claim 12, wherein:
the verification device is configured to verify reliability of the position coordinates, and/or velocity, based on a plurality of id parameters associated with the user; and
at least one of the plurality of id parameters is selected from the group consisting of: a fingerprint of the user; an eye scan of the user; a photo identification of the user; and a voice identification of the user.

17. The authentication device of claim 12, wherein the GNSS receiver is a real time kinematic (RTK) GPS satellite navigation receiver.

18. A non-transitory computer-readable storage medium useful in association with an authentication system the non-transitory computer-readable storage medium including computer-readable code instructions configured to cause a processor to execute the steps of:
receiving a navigation signal transmitted from a radio-positioning system by using a GNSS receiver that is part of the authentication system;
calculating position coordinates, and/or velocity, of the GNSS receiver, at a certain time, by using the processor, wherein the processor is part of the authentication system;
authenticating the navigation signal that has been transmitted using range code encryption using the authentication system;
receiving an input from a user of the authentication system at the certain time using a verification device of the authentication system;
verifying reliability of the position coordinates, and/or velocity, of the GNSS receiver calculated by the processor based on verifying an identity of the user accessing the authentication system, wherein the identity of the user is verified based on the input from the user at the certain time; and
providing a plurality of authentication personal services for verification of:
a proper patient,
a proper operational procedure, and
a proper body part of the proper patient that is subject to the proper operational procedure by:
calculating, based on the navigational signal, a location of an operating suite to perform an operational procedure;
calculating, based on the navigation signal, a location of a body part that is subject to the operational procedure, wherein:
the location of the body part is calculated in relation to an operation table placed in a coordinate system in the operating suite; and
calculating, based on the navigation signal, a timing of the operational procedure.

19. A computer program product that includes a non-transitory computer-readable medium having a sequence of instructions which, when executed by a processor, causes the processor to execute a process for providing a verified authentication service upon request, the process comprising:
receiving a navigation signal transmitted from a radio-positioning system by using a GNSS receiver, at a certain time, that is part of an authentication system, wherein:
the GNSS receiver is a real time kinematic (RTK) GPS satellite navigation receiver;
calculating, periodically within a time range, position coordinates, and/or velocity, of the GNSS receiver by using the processor, wherein the processor is part of the authentication system;
authenticating the navigation signal that has been transmitted using range code encryption using the authentication system;
receiving an input from a user, at the certain time, of the authentication system using a verification device of the authentication system;

verifying reliability of the position coordinates, and/or velocity, of the GNSS receiver calculated by the processor, wherein verifying reliability of the position coordinates, and/or velocity, of the GNSS receiver is based on:
   verifying an identity of the user accessing the authentication system by:
      querying a database containing a plurality of identification parameters to verify the identity of the user using the input from the user, wherein at least one of the plurality of identification parameters is selected from the group consisting of:
         a fingerprint;
         an eye scan;
         a photo identification; and
         a voice identification; and
   verifying a plurality of parameters associated with the GNSS receiver, wherein at least one of the plurality of parameters associated with the GNSS receiver is selected from the group consisting of:
      an identification number of the processor; and
      a predetermined password configured to lock/unlock the GNSS receiver;
providing authentication services for verification of a proper patient, a proper operational procedure, and a proper body part that is subject to the proper operational procedure by:
   calculating, based on the navigational signal, a location of an operating suite to perform an operational procedure;
   calculating, based on the navigation signal, a location of a body part that is subject to the operational procedure, wherein:
      the location of the body part is calculated in relation to an operation table placed in a coordinate system in the operating suite;
   calculating, based on the navigation signal, a timing of the operational procedure;
   receiving a fingerprint of an anesthesiologist to confirm identity of the anesthesiologist, wherein the anesthesiologist is to administer anesthetic for the proper operational procedure;
   receiving a fingerprint of a surgeon to confirm to identity of the surgeon, wherein the surgeon is to perform the proper operational procedure; and
   transmitting information regarding verifying reliability of the position coordinates, and/or velocity, to an authorized party based on the surgeon attempting to operate on a body part other than the proper body part of the proper patient.

20. The method of claim 5, wherein the input from the surgeon is a fingerprint.

21. The authentication device of claim 12, wherein the processor is an application specific integrated circuit.

22. The authentication device of claim 12, wherein the GNSS receiver is configured to receive radio signals from a Quasi-Zenith Satellite System (QZSS).

23. The method of claim 1, wherein verifying reliability of the position coordinates, and/or velocity, of the GNSS receiver is performed by the verification device without further processing the navigation signal by the verification device.

* * * * *